Figure 1:
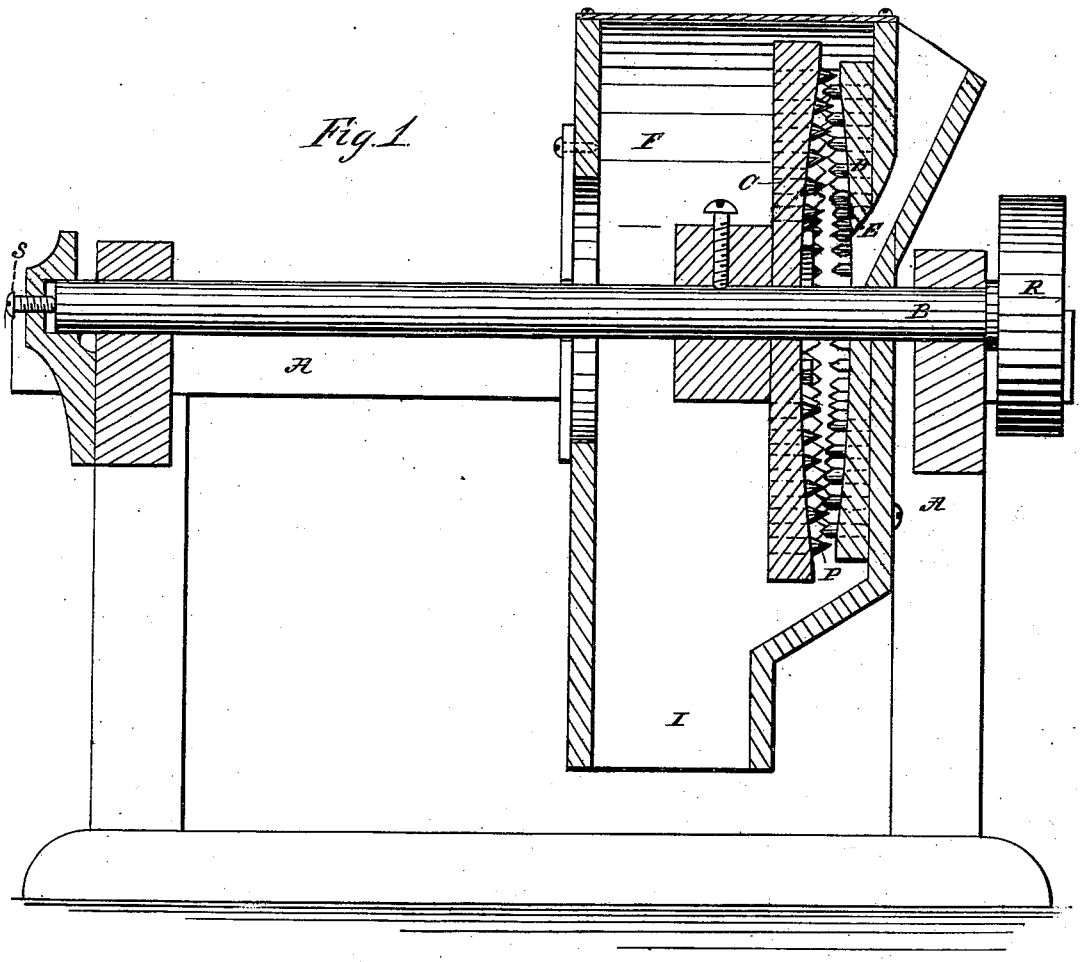

L. GATHMANN.
Bran Cleaner.

No. 228,340.

2 Sheets—Sheet 1.

Patented June 1, 1880.

Witnesses
F. B. Townsend
W. C. Adams

Inventor
Louis Gathmann
per M. E. Dayton
Attorney

2 Sheets—Sheet 2.
L. GATHMANN.
Bran Cleaner.
No. 228,340. Patented June 1, 1880.
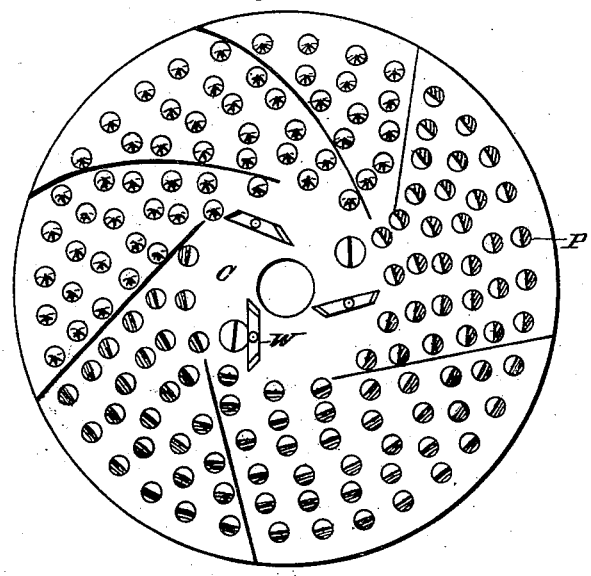
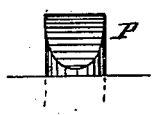  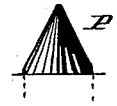
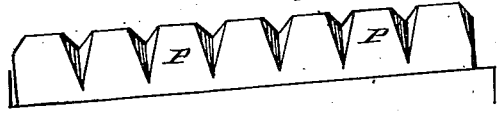
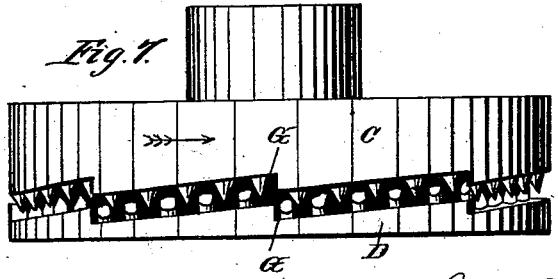
Witnesses.
F. B. Townsend
W. C. Adams
Inventor-
Louis Gathmann
per M. E. Dayton
Attorney.

UNITED STATES PATENT OFFICE.

LOUIS GATHMANN, OF CHICAGO, ILLINOIS.

BRAN-CLEANER.

SPECIFICATION forming part of Letters Patent No. 228,340, dated June 1, 1880.

Application filed February 14, 1880.

*To all whom it may concern:*

Be it known that I, LOUIS GATHMANN, of Chicago, in the State of Illinois, have invented certain new and useful Improvements in Bran-Cleaners; and I do hereby declare that the following is a full, clear, and exact description thereof, reference being had to the accompanying drawings, and to the letters of reference marked thereon, which form a part of this specification.

The machine to which my invention relates is intended to supplement the action of mill-stones or other machines for the reduction of grain, its office being to remove the food substance still left adhering to the bran after its passage through such reduction-mills.

The object of the invention is to produce a crumpling of the bran flaked together with concussion and severe intermittent attrition of the bran-flakes upon each other, for the purpose of breaking and detaching the food substance in the form of middlings.

The invention consists in the devices hereinafter fully set forth, and pointed out in the claims.

In the drawings, Figure 1 is a central vertical longitudinal section of the machine. Fig. 2 is a plan view of one of the disk-faces. Figs. 3, 4, 5, and 6 are views of several forms of teeth or pins set in the faces of the disks; and Fig. 7 is a side view of the disks in working proximity.

A is a frame-work, in which is mounted the horizontal shaft B, driven by the pulley R. C is a disk secured to the shaft B, and D is a similar stationary disk. The disks are inclosed by a housing, F. A feed-hopper, E, delivers the bran to be cleaned through and near the center of the stationary disk D, and the cleaned bran escapes from the disks at their periphery and is discharged at I. The disks are provided on their inner faces with furrows G G, somewhat like those of a millstone, and are also studded with short pins P P, arranged in concentric circles, as shown clearly in Figs. 1 and 3. The several circles of pins of one disk stand opposite the interval between circles in the other disk. These pins are conical or beveled to a blunt edge, and the adjacent circles of pins on each disk are set so near to each other as to form intervals between such circles, which are, in one view, substantially V-shaped grooves, in which the correspondingly-beveled pins of the opposite disk run.

The disk C is adjustable toward or from the stationary disk D by means of the set-screw s operating to move the shaft B longitudinally. In this movement of the shaft not only may the space between the disks be lessened, but the pins P of the opposite disks, by reason of their tapering or beveled form, may also be brought nearer each other, an adjustment obviously not possible in the case of intercurrent pins of uniform diameter heretofore in use. The pins may be given an inclined bevel, (shown in Fig. 4,) if desired, and they may also be set in blocks, as illustrated in Fig. 6; but generally I prefer the conical form described, set detached, as shown in Fig. 2. One or both of the disks should be dished, or the furrows G should be deepened at their inner extremities, in order that sufficient material may pass to the periphery to secure the desired action of the marginal pins thereon. The action of the pins is to give repeated concussions upon the divided masses of bran-flakes caught between them, doubling or crumpling them in such manner as to break up and partially detach the food substance adhering thereto in granular form, and also by compressing the flakes within the narrowing spaces between the pins and between the ridges of the furrows, to intermittently and violently rub the bran-flakes upon each other and upon the pins, and thus wholly disengage the granules so loosened. The pins P preferably project equally from the disk-surfaces, so that those pins in the deeper parts of the furrows do not rise to the level of those at the ridges. Coincidence of the furrows of opposite disks therefore permits the bran to pass outward by centrifugal action until again caught and restrained by the pins of the rapidly-rotating disk.

The fixed wings W obviously serve to force the bran as it is received through the feed-spout E outward among the pins, where centrifugal action is sufficient to secure its further movement toward the periphery.

The disk-faces may be made of cast-iron, having the pins P cast thereon, or they may be covered with sheet metal, and the pins be of steel, set firmly in a wood backing. From the shortness of the pins they are not liable to break off, and their tapering form at the point insures a pressure upon them inwardly in operation, calculated to prevent their working loose.

I have shown the machine as having the axis of the disks horizontal. Obviously it may be arranged with said axis vertical. In that case I prefer that the lower disk shall rotate.

Having thus described my invention, I claim—

1. In a bran-cleaning machine, the rotating disk C and the stationary disk D, provided with intercurrent circles of face-pins P, and having the face of one or both disks furrowed, substantially as and for the purpose specified.

2. A bran-cleaning machine consisting, essentially, of the relatively-moving adjustable disks C and D, one or both dished and furrowed, as shown, and both provided with intercurrent circles of tapering pins, substantially as described.

In testimony that I claim the foregoing as my invention I affix my signature in presence of two witnesses.

LOUIS GATHMANN.

Witnesses:
M. E. DAYTON,
PETER J. ELLERT.